No. 794,801. PATENTED JULY 18, 1905.
B. HOLT.
STEAM COMBINED HARVESTING OUTFIT.
APPLICATION FILED DEC. 13, 1904.
2 SHEETS—SHEET 2.
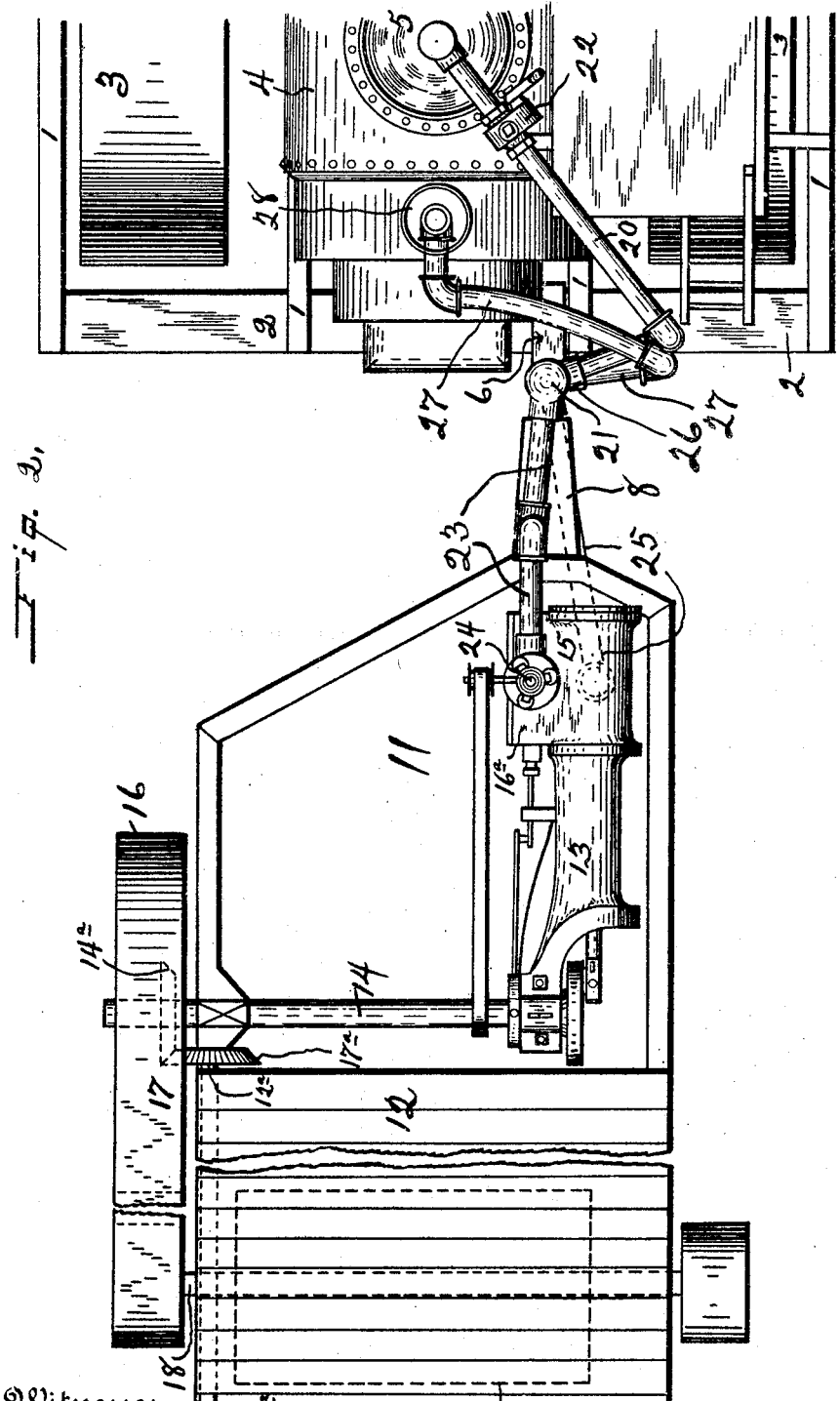
Witnesses
M. Haynes
P. Haynes
Inventor
Benjamin Holt.

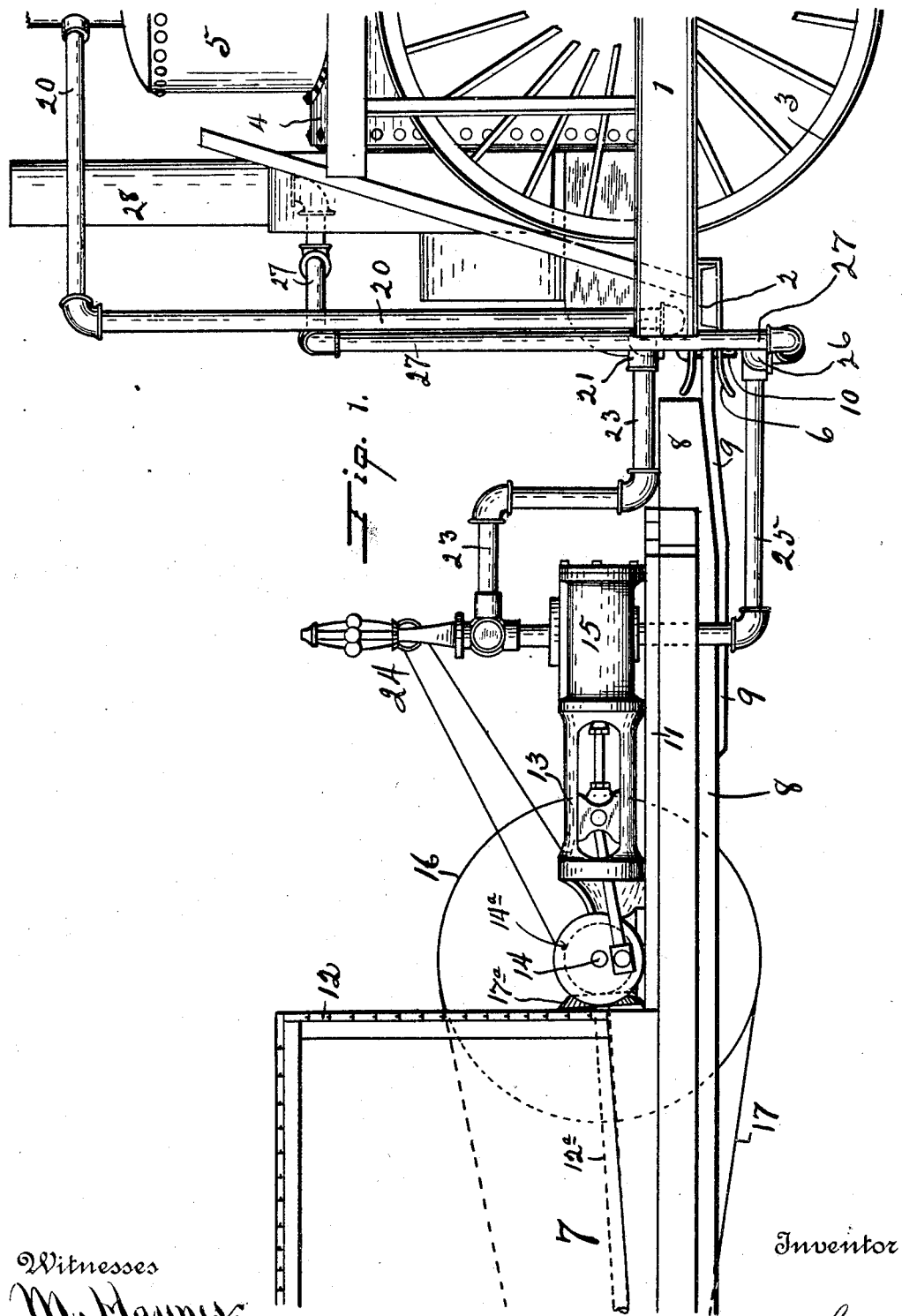

No. 794,801. Patented July 18, 1905.

UNITED STATES PATENT OFFICE.

BENJAMIN HOLT, OF STOCKTON, CALIFORNIA.

STEAM COMBINED HARVESTING OUTFIT.

SPECIFICATION forming part of Letters Patent No. 794,801, dated July 18, 1905.

Application filed December 13, 1904. Serial No. 236,698.

*To all whom it may concern:*

Be it known that I, BENJAMIN HOLT, a citizen of the United States, residing at Stockton, in the county of San Joaquin and State of California, have invented certain new and useful Improvements in Steam Combined Harvesting Outfits, of which the following is a specification.

My invention relates to that class of harvesting machinery wherein a combined traveling thresher is drawn by a steam traction-engine and has an auxiliary steam-engine located on and attached to the front end of the harvester by which the machinery of said harvester is operated.

My invention particularly relates to the arrangement of said auxiliary engine on said harvester and the connections by which steam is introduced from the traction-engine into the auxiliary engine and from there exhausted into the smoke-stack of the traction-engine, which are its objects, together with the convenience and accessibility of parts and the economy of fuel required in the traction-engine by reason of the exhaust of the auxiliary engine into the smoke-stack of said traction-engine. These objects I attain by the peculiar construction, novel combination, and adaptation of parts, hereinafter described, and particularly pointed out in the claim hereunto annexed, reference being had to the accompanying drawings, in which—

Figure 1 is a right-hand side elevation of the rear end of a traction-engine and the front end of a combined traveling thresher with my invention arranged thereon. Fig. 2 is a plan view of the same.

Similar figures of reference indicate corresponding parts in both the views.

The traction-engine, composed of the longitudinal frame-beams 1 and the rear cross-beam 2, resting on the main wheels 3 and carrying the boiler 4, which is provided with the steam-dome 5, has the front end of the thresher 7 attached thereto by means of the coupling 6, which is secured to the cross-beam 2.

The thresher 7 has the main longitudinal beam 8, adapted to receive the coupling-iron 9, through which the pin 10 is introduced, connecting it with the coupling 6. A platform 11 is located on said beam 8 in front of the cylinder feed-house 12 and adapted to receive a horizontal steam-engine 13 of ordinary design, arranged longitudinally of said thresher, with its shaft 14 extending to one side, preferably the left side, of the separator, where it is journaled in suitable bearings and has a pulley 16 rigidly secured thereto, from which power is communicated, by means of a belt 17, to a pulley on one end of the cylinder-shaft 18, carrying the cylinder 19, which is of the design, form, and function usually employed in machines of this class.

I arrange a bevel gear-wheel 14$^a$ on the shaft 14 near the pulley 16, which is adapted to engage with a similar gear-wheel 17$^a$, mounted on and rigidly attached to a shaft 12$^a$, which is arranged longitudinally on the left-hand side of the thresher 7. This arrangement makes the gear-wheels and bearings of the shafts easily accessible.

The bed of the engine 13 is arranged parallel to, above, and a little to one side of the beam 8, which gives it a rigid foundation and at the same time permits of easy access to the parts beneath the cylinder 15 and steam-chest 16$^a$.

Steam is conducted from the boiler of the traction-engine to the cylinder 15 of the engine 13 by a series of pipes and joints suitably secured in position, of which the pipe 20 is connected to the steam-dome 5 and extends to a universal steam-pipe joint 21, which is located in a line above the coupling 6, having the throttle-valve 22 interposed in its length. A pipe 23 extends from said joint 21 to the steam-chest 16$^a$ of the engine 13, with the usual steam-governor 24, which may be of any approved pattern, interposed in its length.

The exhaust-steam from the engine 13 is conducted by the pipe 25, through the universal steam-pipe joint 26, which is located in a line beneath the coupling 6, up the pipe 27 into the smoke-stack 28 of the traction-engine.

An essential feature of my invention is the arrangement of the universal steam-pipe joints 21 and 26 immediately above and beneath the coupling 6, which arrangement allows a concerted movement of the said joints with the coupling 6 when the traction-engine is making a turn or is traveling over undulative ground without disarranging the pipes in any way, thereby making it possible to exhaust the steam back into the traction-engine, by which an additional forced draft is secured for said traction-engine.

By arranging the engine 13 on the front end of the thresher, the shaft is directly in line with the cylinder-shaft 18, and besides being easy of access the thresher does not have to have a specially-constructed frame to receive the engine, which is always in sight of the engineer driving the traction-engine, thus reducing accidents to a minimum.

Many features shown in the drawings are old, and many old parts are only partly shown, as I have shown such old parts only as are necessary to illustrate their connection with my invention.

I am aware that threshers have been made which were designed to be driven by an auxiliary steam-engine. Therefore that feature I do not claim broadly.

Having thus described my invention, what I claim as new, and desire to secure by Letters Patent, is—

In a machine of the class described the combination; a traveling thresher coupled behind a traction-engine, having the engine 13, 15, 16$^a$, mounted on the front end, longitudinally, thereof, with its crank-shaft 14 arranged crosswise of said thresher and adapted to carry a bevel gear-wheel and pulley on the outer end thereof, the longitudinal shaft 12$^a$, carrying the bevel gear-wheel 17$^a$ which is adapted to engage the bevel gear-wheel aforesaid, arranged on the left-hand side of the thresher, two universal steam-pipe joints arranged one above and one below the coupling between said traction-engine and thresher, through one of which, by means of suitable pipes, steam is conducted from the boiler of the traction-engine to said auxiliary engine and through the other one of said universal joints, by means of suitable pipes, the exhaust-steam is conducted from said auxiliary engine into the smoke-stack of the traction-engine all arranged and operating substantially as shown and described and for the purposes specified.

In testimony whereof I have signed my name to this specification in the presence of two subscribing witnesses.

BENJAMIN HOLT.

Witnesses:
P. E. HOLT,
M. HAYNES.